United States Patent
Tsai et al.

(10) Patent No.: US 8,960,980 B2
(45) Date of Patent: Feb. 24, 2015

(54) LIGHT SOURCE MODULE HAVING A CURVED OPTICAL UNIT

(71) Applicants: Han-Wen Tsai, Hsin-Chu (TW); Ching-Wei Yu, Hsin-Chu (TW); Ming-Feng Kuo, Hsin-Chu (TW); Cheng Wang, Hsin-Chu (TW)

(72) Inventors: Han-Wen Tsai, Hsin-Chu (TW); Ching-Wei Yu, Hsin-Chu (TW); Ming-Feng Kuo, Hsin-Chu (TW); Cheng Wang, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 61 days.

(21) Appl. No.: 13/789,683

(22) Filed: Mar. 8, 2013

(65) Prior Publication Data

US 2013/0235608 A1    Sep. 12, 2013

(30) Foreign Application Priority Data

Mar. 9, 2012  (TW) .............................. 101108149 A

(51) Int. Cl.
*F21V 8/00*    (2006.01)

(52) U.S. Cl.
CPC .................................... *G02B 6/0008* (2013.01)
USPC ......................................... 362/555; 362/551

(58) Field of Classification Search
USPC .................................................. 362/551, 555
See application file for complete search history.

(56) References Cited

U.S. PATENT DOCUMENTS

| | | | |
|---|---|---|---|
| 5,581,683 A | 12/1996 | Bertignoll et al. | |
| 5,757,557 A | 5/1998 | Medvedev et al. | |
| 7,290,906 B2 * | 11/2007 | Suzuki et al. | 362/511 |
| 7,401,947 B2 | 7/2008 | Wanninger et al. | |
| 7,581,862 B2 | 9/2009 | Stefanov et al. | |
| 7,855,815 B2 * | 12/2010 | Hayashide et al. | 358/484 |
| 7,926,995 B2 * | 4/2011 | Forrester et al. | 362/558 |
| 7,980,741 B2 * | 7/2011 | Zwick | 362/511 |
| 8,007,157 B2 * | 8/2011 | Lin | 362/560 |
| 2004/0262053 A1 | 12/2004 | Ludewig et al. | |

FOREIGN PATENT DOCUMENTS

| | | |
|---|---|---|
| CN | 1763423 A | 4/2006 |
| CN | 101118043 A | 2/2008 |
| CN | 201439888 | 4/2010 |

(Continued)

OTHER PUBLICATIONS

"Office Action of Taiwan Counterpart Application", issued on Feb. 19, 2014, p. 1-p. 5.

(Continued)

*Primary Examiner* — Anabel Ton
(74) *Attorney, Agent, or Firm* — Jianq Chyun IP Office

(57) ABSTRACT

A light source module includes an optical unit, which includes a light-emitting device, a light-guiding device and a light-converging structure. The light-guiding device has a light incident end, a light emitting end, a first curved surface connecting the light incident end and the light emitting end, and a side surface. The light-emitting device is disposed beside the light incident end. The section of the first curved surface by the side surface is a first curve. The section of the first curved surface by the reference plane perpendicular to the side surface is a second curve. The light-converging structure is disposed between the light-emitting device and the light incident end and has a first arc-convex surface and two second convex surfaces, in which the first arc-convex surface and the second convex surfaces are arranged along a direction parallel to the side-surface.

21 Claims, 9 Drawing Sheets

(56) References Cited

FOREIGN PATENT DOCUMENTS

| | | |
|---|---|---|
| CN | 102262262 A | 11/2011 |
| DE | 10139578 | 4/2003 |
| DE | 19961491 B4 | 8/2005 |
| JP | 2008060061 | 3/2008 |
| TW | 200639518 | 11/2006 |
| TW | M315871 | 7/2007 |
| TW | 200912200 | 3/2009 |

OTHER PUBLICATIONS

"Office Action of China Counterpart Application", issued on Oct. 21, 2014, pp. 1-9.

* cited by examiner

LIGHT SOURCE MODULE HAVING A CURVED OPTICAL UNIT

CROSS-REFERENCE TO RELATED APPLICATION

This application claims the priority benefit of Taiwan application serial no. 101108149, filed on Mar. 9, 2012. The entirety of the above-mentioned patent application is hereby incorporated by reference herein and made a part of this specification.

BACKGROUND OF THE INVENTION

1. Field of the Invention

The invention generally relates to an optical module, and more particularly to a light source module.

2. Description of Related Art

In the prior art, a light source module used for a vehicle headlight may be roughly divided into reflective one and projective one. In the application of the headlights, the reflective light source module requires to employ a large reflective cover to converge the beam effect, so that the reflective light source module has a larger volume. In particular, the light-radiation pattern of the reflective light source module at the front of the vehicle with 25 meters distance tends having problem of indistinct bright-dark cut-off lines. In addition, since the light beam in the module is reflected by the reflective cover, the reflective light source module has a poor light utilization efficiency. The projective light source module, on the contrary, is able to form a light-radiation pattern with distinct bright-dark cut-off lines at the front of the vehicle with 25 meters distance by employing a light barrier. However, the light barrier would block some of light beam to exit and thereby affect the light utilization efficiency of the projective light source module. In addition, how to achieve the configuration of light-radiation pattern of ECE R112 code in Regulations of United Nations Economic Commission for Europe (ECE regulations) is still a big challenge for the projective light source module. In general speaking, in order to form an uniform bright surface, the luminance of bright spots are usually not sufficient or it fails to form bright spots at predetermined positions and the bright-dark cut-off lines between bright surface and dark surface are indistinct as well. If the luminance of bright spots is enough, the uniformity of bright surface is not satisfied or the light-radiation pattern of bright surface does not conform with a predetermined shape. For a conventional illumination or projection system, the bright spot is usually located at its middle; if the bright spot needs to be close to the edge of a bright surface by design, complicated optical elements are required, and employing so complicated optical elements, in turn, would reduce the luminance of the bright surface so that a larger power of the light source is needed.

U.S. Pat. No. 5,581,683 discloses a scheme that the light beam emitted by a light-emitting diode (LED) passes through a U-shape light-guiding device to reach at a light diffuser. U.S. Pat. No. 7,581,862 discloses another scheme that the light beam emitted by an LED reaches at a focusing lens via a ring-shape light-guiding device. U.S. Pat. No. 7,980,741 discloses yet another scheme that a light beam produced by a light source of a vehicle headlight reaches at a light emitting surface of a light-guiding structure via the light-guiding structure. Taiwan patent application publication No. 200912200 discloses a scheme that a radial optical signal emitted by a light source produces a collimated signal parallel to the exiting light through a transmission device and a collimator device (i.e. a direction-turning device). Taiwan patent application publication No. 200639518 discloses an illumination system including a plurality of collimating segments and a light-mixing segment. U.S. Pat. No. 5,757,557 discloses a conic lens with planes and internal cavities. U.S. Pat. No. 7,401,947 discloses an optical device for the light beam emitted by a light source to pass through and an optical equipment.

SUMMARY OF THE INVENTION

Accordingly, the invention is directed to a light source module with good optical performance.

Other objectives and advantages of the invention may be further illustrated by the technical features disclosed by the invention.

In order to achieve one of the above purposes, all the purposes, or other purposes, one embodiment of the invention provides a light source module, which includes at least one optical unit, wherein the optical unit includes at least one light-emitting device; at least one light-guiding device and at least one light-converging structure. The light-guiding device has a light incident end, a light emitting end, a first curved surface connecting the light incident end and the light emitting end, a second curved surface opposite to the first curved surface and connecting the light incident end and the light emitting end, and a side-surface connecting the first curved surface and the second curved surface and connecting the light incident end and the light emitting end, in which the light-emitting device is disposed beside the light incident end, the cross-sectional line of the first curved surface sectioned by the side-surface is a first curved line, and the cross-sectional line of the first curved surface sectioned by a reference plane perpendicular to the side-surface is a second curved line. The light-converging structure is located between the light-emitting device and the light incident end, and the light-converging structure has a first arc-convex surface protruded towards the light-emitting device and two second convex surfaces respectively located at two opposite sides of the first arc-convex surface, in which the first arc-convex surface and the two second convex surfaces are arranged along a direction parallel to the side-surface.

In the light source module of an embodiment of the invention, the above-mentioned first curved line is quadratic curved line.

In the light source module of an embodiment of the invention, the above-mentioned second curved line is quadratic curved line and the quadratic curved line is parabola or elliptic curve.

In the light source module of an embodiment of the invention, the above-mentioned second curved line has a focus and the orthogonal projection of the focus on the reference plane is superposed with the orthogonal projection of the light-emitting device on the reference plane.

In the light source module of an embodiment of the invention, the cross-sectional line of the first arc-convex surface sectioned by the side-surface and the cross-sectional lines of the second convex surfaces sectioned by the side-surface include curved lines, and the cross-sectional line of the first arc-convex surface sectioned by the reference plane and the cross-sectional lines of the second convex surfaces sectioned by the reference plane include straight lines.

In the light source module of an embodiment of the invention, the cross-sectional line of the first arc-convex surface sectioned by the side-surface and the cross-sectional lines of the second convex surfaces sectioned by the side-surface include parabola.

In the light source module of an embodiment of the invention, the above-mentioned cross-sectional line of the second curved surface sectioned by the reference plane includes a straight line.

In the light source module of an embodiment of the invention, the above-mentioned optical unit further includes a first lens located beside the light emitting end.

In the light source module of an embodiment of the invention, the above-mentioned first lens has a light incident surface and a light-adjusting curved surface, the light incident surface is located between the light-adjusting curved surface and the light emitting end, and the light-adjusting curved surface is a spherical surface or an aspheric curved surface.

In the light source module of an embodiment of the invention, the above-mentioned light-adjusting curved surface has an optical axis and the optical axis is substantially parallel to the tangent direction of the first curved line at the light emitting end.

In the light source module of an embodiment of the invention, the above-mentioned light-adjusting curved surface has an optical axis and the optical axis is tilted to the tangent direction of the first curved line at the light emitting end.

In the light source module of an embodiment of the invention, the cross-sectional line of the light-adjusting curved surface sectioned by the side-surface includes a curved line and the orthogonal projection of the light-adjusting curved surface on the reference plane includes a straight line.

The light source module in an embodiment of the invention further includes a plurality of light-emitting devices arranged along the normal direction of the side-surface, a plurality of light-guiding devices arranged along the normal direction of the side-surface and a plurality of light-converging structures arranged along the normal direction of the side-surface.

The light source module in an embodiment of the invention further includes a plurality of optical units, in which the directions of the side-surfaces of the optical units are not parallel to each other.

In the light source module of an embodiment of the invention, a light-emitting device in one of the above-mentioned optical units is located between the light emitting end of the optical unit and the light emitting end of another optical unit.

In the light source module of an embodiment of the invention, the side-surface of the optical unit is located between the light incident end of the optical unit and the light incident end of another optical unit.

In an embodiment of the invention, the above-mentioned optical unit further includes a first lens and a light-adjusting device both located beside the light emitting end, and the first lens and the light-converging structure are located between the light-guiding device and the light-adjusting device, in which the light-adjusting device of an optical unit among the optical units is configured for converging light, while the light-adjusting device of another optical unit among the optical units is configured for diverging light.

In the light source module of an embodiment of the invention, the above-mentioned optical unit further includes a reflective device, and the light-emitting device is located between the reflective device and the light-converging structure.

In the light source module of an embodiment of the invention, the above-mentioned light-guiding device further includes a light-mixing segment and the light-mixing segment is connected to the light emitting end.

In the light source module of an embodiment of the invention, the above-mentioned light-mixing segment has a tilting surface tilted relatively to the tangent direction of the first curved line at the light emitting end.

The light source module in an embodiment of the invention further includes another optical unit, in which the light source module further includes a light-mixing segment, one end of the light-mixing segment is connected to the two light emitting ends of the two light-guiding devices of the two optical units, and the two light emitting ends of the two light-guiding devices are located between the two light incident ends of the two light-guiding devices.

Based on the description above, the light source module in an embodiment of the invention, by disposing the first curved surface, the second curved surface and the light-converging structure, is able to make the diverging conic angle of the exiting light beam more concentrated on two different directions, which further advances the converging effect of the light source module so as to form a bright surface with high contrast bright-dark cut-off lines on the surface of the illumination region irradiated by the light source module. The light source module in an embodiment of the invention, by disposing the first lens or the light-adjusting device, is able to form a plurality of bright spots focused by light beams and a light-radiation pattern configuration of the uniform bright surface in the illumination region irradiated by the light source module, and is able to separately adjust the light-radiation pattern of the bright surface and the positions and the relative positions of the bright spots focused by the light beams and the bright surface and make the position of the bright spot focused by the light beam close to the edge of the bright surface by adjusting the focal length or the deflection direction of the first lens or the light-adjusting device. Since the light source module in an embodiment of the invention utilizes most of the light beams emitted by the light-emitting devices to irradiate at predetermined positions of the illumination region and form uniform bright surface and focusing bright spots, the invention may save energy without additionally increasing the power of the light-emitting device as the prior art.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The First Embodiment

Figure 1:
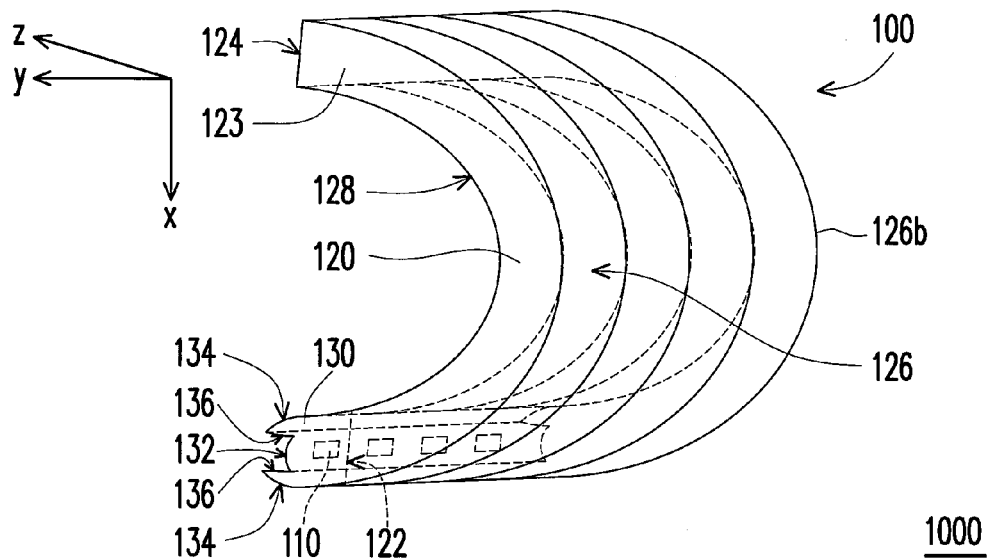
FIGS. 1, 2 and 3 are schematic three-dimensional diagrams of a light source module according to an embodiment of the invention.
Figure 2:
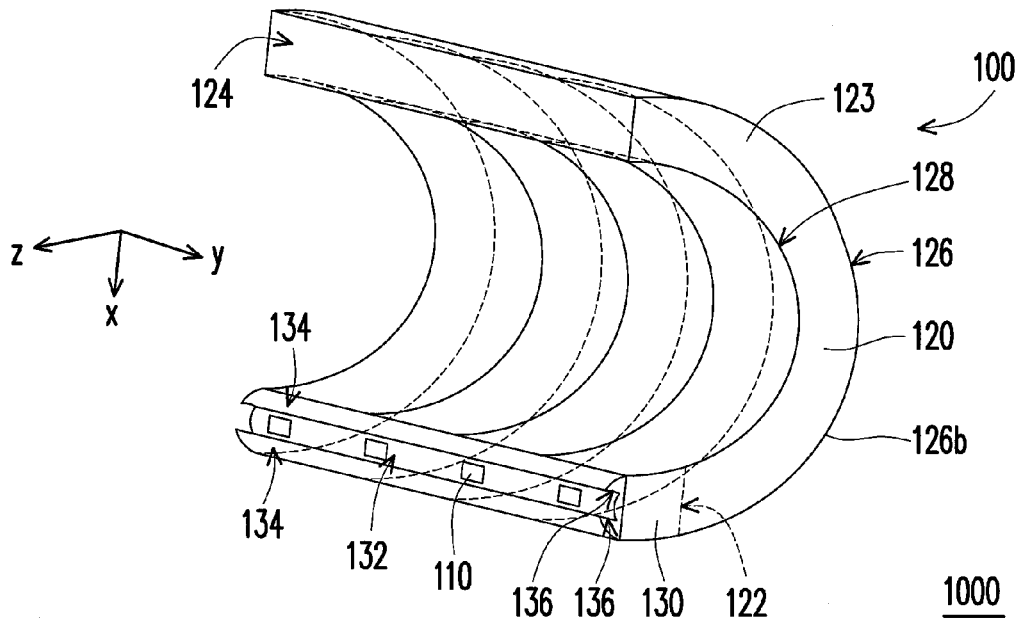
Figure 3:
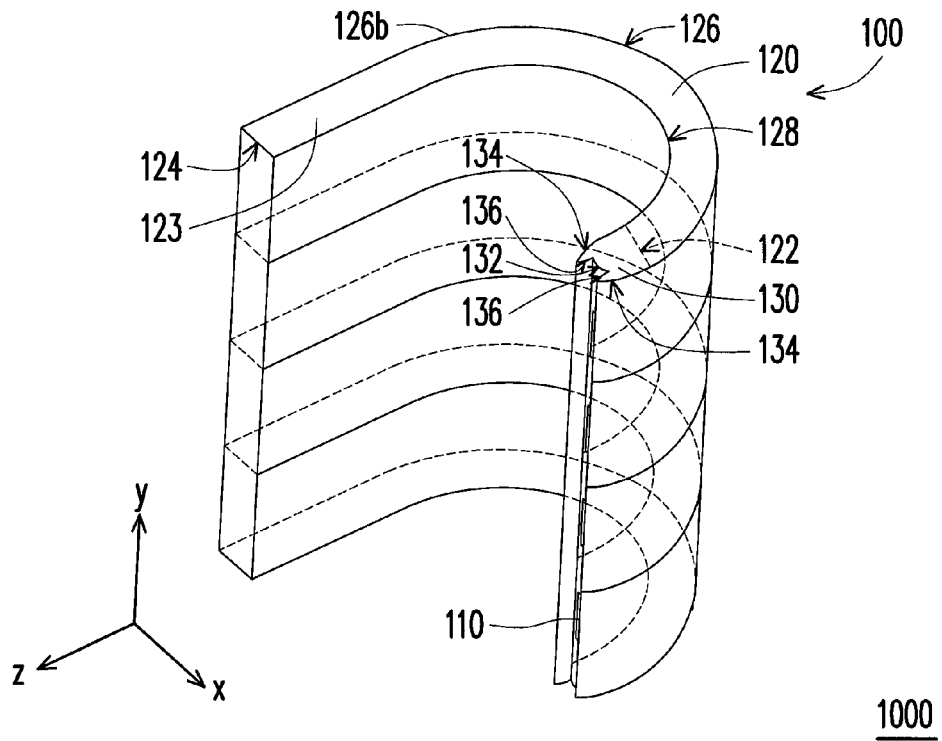

FIGS. 1, 2 and 3 are schematic three-dimensional diagrams of a light source module according to an embodiment of the invention. Referring to FIGS. 1, 2 and 3, the light source module 1000 of the embodiment includes at least one optical unit 100. Each of the optical units 100 includes at least one light-emitting device 110, at least one light-guiding device 120 and at least one light-converging structure 130. The light source module 1000 of the FIGS. 1, 2 and 3 includes an optical unit 100. The optical unit 100 of the FIGS. 1, 2 and 3 includes four light-emitting devices 110 arranged along the normal direction (y-direction) of a side-surface 123, four light-guiding devices 120 arranged along the normal direction (y-direction) of the side-surface 123 and four light-converging structures 130 arranged along the normal direction (y-direction) of the side-surface 123. However, the invention does not limit the quantity of the optical units 100 in the light source module 1000, and does not limit the quantities of the light-emitting device 110, the light-guiding device 120 and the light-converging structure 130 in each optical unit 100 as well. In fact, the quantity of the optical units 100 in the light source module 1000 and the quantities of the light-emitting device 110, the light-guiding device 120 and the light-converging structure 130 in each optical unit 100 may be defined by an appropriate design depending on the real requirement.

The light-guiding device 120 of the embodiment has a light incident end 122, a light emitting end 124, a first curved surface 126 connecting the light incident end 122 and the light emitting end 124, a second curved surface 128 opposite to the first curved surface 126 and connecting the light incident end 122 and the light emitting end 124 and a side-surface 123 connecting the first curved surface 126 and the second curved surface 128 and connecting the light incident end 122 and the light emitting end 124. The light-emitting device 110 is disposed beside the light incident end 122. The cross-sectional line of the first curved surface 126 sectioned by the side-surface 123 is a first curved line 126b. The cross-sectional line of the first curved surface 126 sectioned by a reference plane (yz-plane) perpendicular to the side-surface 123 is a second curved line 126a. The first curved surface 126 curvedly extends to the light emitting end 124 from the light incident end 122. The second curved surface 128 curvedly at the inner side of the first curved surface 126 extends to the light emitting end 124 from the light incident end 122.

The cross-sectional line of the second curved surface 128 sectioned by the side-surface 123 is also a curved line, but the cross-sectional line of the second curved surface 128 sectioned by the reference plane (yz-plane) may be not curved. The light emitting end 124 of the embodiment may be a plane parallel to the xy-plane or a plane with an included angle towards the xy-plane. The light-emitting device 110 of the embodiment is, for example, a light-emitting diode (LED), an organic LED or a high-pressure gas discharge lamp, which the invention is not limited to. The first curved surface 126 or the second curved surface 128 of the embodiment may be with coating a reflective film or without coating a reflective film, which the invention is not limited to.

Figure 4:
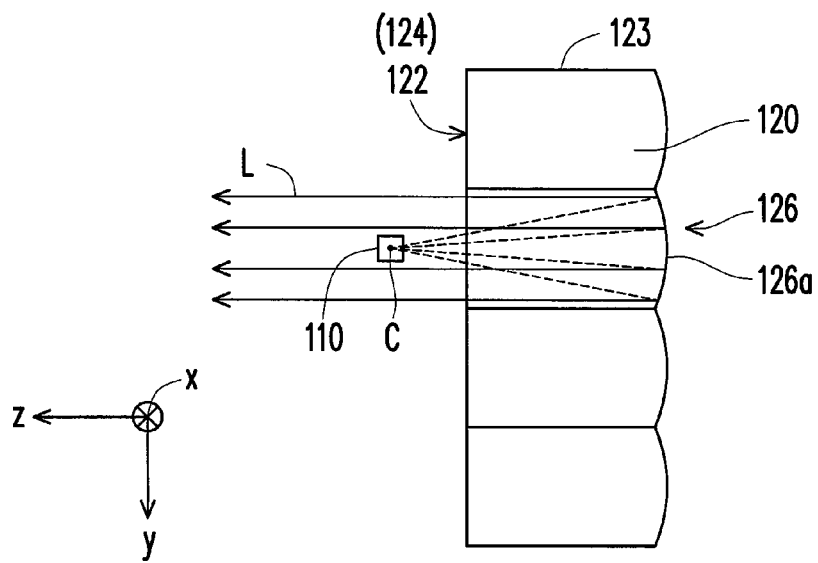
FIG. 4 is a schematic top-view diagram of the light-guiding devices of FIG. 1.

FIG. 4 is a schematic top-view diagram of the light-guiding devices 120 of FIG. 1. Referring to FIGS. 1 and 4, the first curved surface 126 of the embodiment may be a quadratic surface. In other words, the second curved line 126a (shown by FIG. 4) may be a quadratic curved line. The quadratic curved line includes a parabola or a part of elliptic curve, or a free-form curved line. The second curved line 126a may have a focus C (shown by FIG. 4) and the orthogonal projection of the focus C on the reference plane (yz-plane) may be superposed with the orthogonal projection of the light-emitting device 110 on the reference plane (yz-plane). In the embodiment, since the first curved surface 126 may be a quadratic surface and the focus C may be superposed with the light-emitting device 110 on the reference plane (yz-plane), so that the light beam L emitted from the light-emitting device 110 is more converged on the y direction through the reflection of the first curved surface 126.

Referring to FIGS. 1, 2 and 3, the light-converging structure 130 of the embodiment is located between the light-emitting device 110 and the light incident end 122. The light-converging structure 130 has a first arc-convex surface 132 protruded towards the light-emitting device 110 and two second convex surfaces 134 respectively at two opposite sides of the first arc-convex surface 132. The first arc-convex surface 132 and the two second convex surfaces 134 are arranged along a direction parallel to the side-surface 123 (x-direction). In the embodiment, the above-mentioned arrangement direction (x-direction) is substantially perpendicular to the normal direction of the side-surface 123 (y-direction). The cross-sectional lines of the first arc-convex surface 132 and the second convex surfaces 134 sectioned by the side-surface 123 include curved line, while the cross-sectional lines of the first arc-convex surface 132 and the second convex surfaces 134 sectioned by the reference plane (yz-plane) include straight line. In more details, the light-converging structure 130 of the embodiment further has two connection surfaces 136 respectively connecting the first arc-convex surface 132 and the two second convex surfaces 134. In the embodiment, the connection surfaces 136 may be a plane, which the invention is not limited to. In other embodiments, the connection surfaces 136 may be a curved surface.

Figure 5:
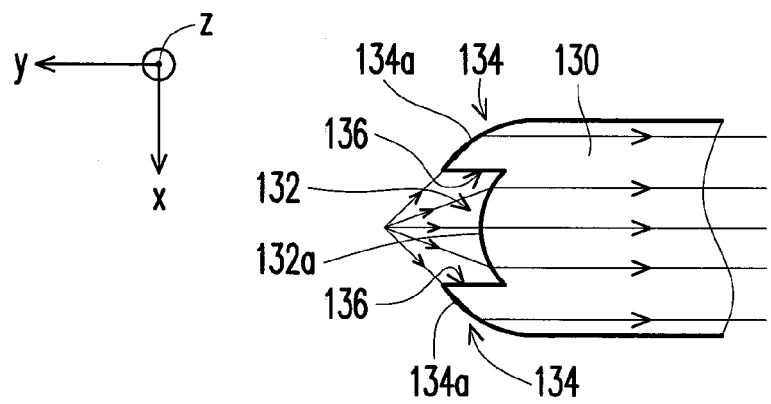
FIG. 5 is a schematic diagram of the light-converging structure of FIG. 1.

FIG. 5 is a schematic diagram of the light-converging structure of FIG. 1. Referring to FIGS. 1 and 5, in the embodiment, the cross-sectional line 132a of the first arc-convex surface 132 sectioned by the side-surface 123 may be a parabola. The cross-sectional lines 134a of the two second convex surfaces 134 sectioned by the side-surface 123 include partial parabolas. Guided by the first arc-convex surface 132 and the second convex surfaces 134, the light beam emitted by the light-emitting device 110 is more concentrated on the x-direction. As shown by FIG. 1, in the embodiment, the light-converging structure 130 may contact the light incident end 122. In other words, the light-converging structure 130 of the embodiment and the light-guiding device 120 may be integrally formed, which the invention is not limited to. In other embodiment, the light-converging structure 130 and the light-guiding device 120 may be separately formed.

The Second Embodiment

Figure 6:
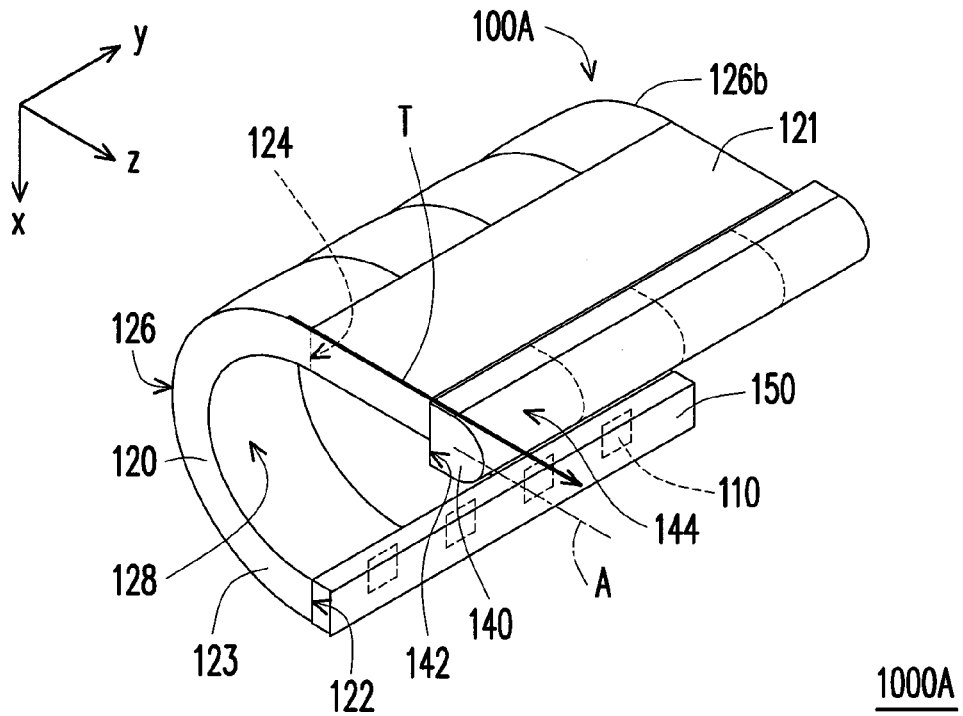
FIG. 6 is a schematic three-dimensional diagram of a light source module according to the second embodiment of the invention.

FIG. 6 is a schematic three-dimensional diagram of a light source module 1000A according to the second embodiment of the invention. Referring to FIG. 6, the light source module 1000A of the embodiment is similar to the light source module 1000 of the first embodiment, and thus, the same parts are represented by the same denotations. The difference of the light source module 1000A of the embodiment from the light source module 1000 of the first embodiment rests in that the optical unit 100A of the light source module 1000A in the embodiment further includes at least one first lens 140 and a reflective device 150, and the light source module 1000A further has a light-mixing segment 121. The difference between the light source modules 1000A and 1000 is described in following, while the duplicated content is omitted to describe.

The light source module 1000A of the embodiment includes at least one optical unit 100A. The optical unit 100A includes four light-emitting devices 110, four light-guiding devices 120A and four light-converging structures (not shown). The optical unit 100A of the embodiment further includes four first lenses 140. The invention does not limited the quantities of the light-emitting device 110, the light-guiding device 120, the light-converging structure and the first lens 140 in each the optical unit 100A. The first lens 140 is located beside the light emitting end 124. In the embodiment, the first lens 140 has a light incident surface 142 and a light-adjusting curved surface 144 connecting the light incident surface 142. The light incident surface 142 is located between the light-adjusting curved surface 144 and the light emitting end 124. In the embodiment, the light-adjusting curved surface 144 may be a spherical surface, an aspheric curved surface, or a cylindrical curved surface, i.e., the cross-sectional line of the light-adjusting curved surface 144 sectioned by the side-surface 123 includes a curved line and the orthogonal projection of the light-adjusting curved surface 144 on the reference plane (yz-plane) includes a straight line. The light-adjusting curved surface 144 has an optical axis A. The optical axis A is substantially parallel to the tangent line T of the first curved line 126b at the light emitting end 124. The first lens 140 of the embodiment is configured for adjusting the light exiting angle of the light source module 1000A on the xz-plane direction.

Figure 7:
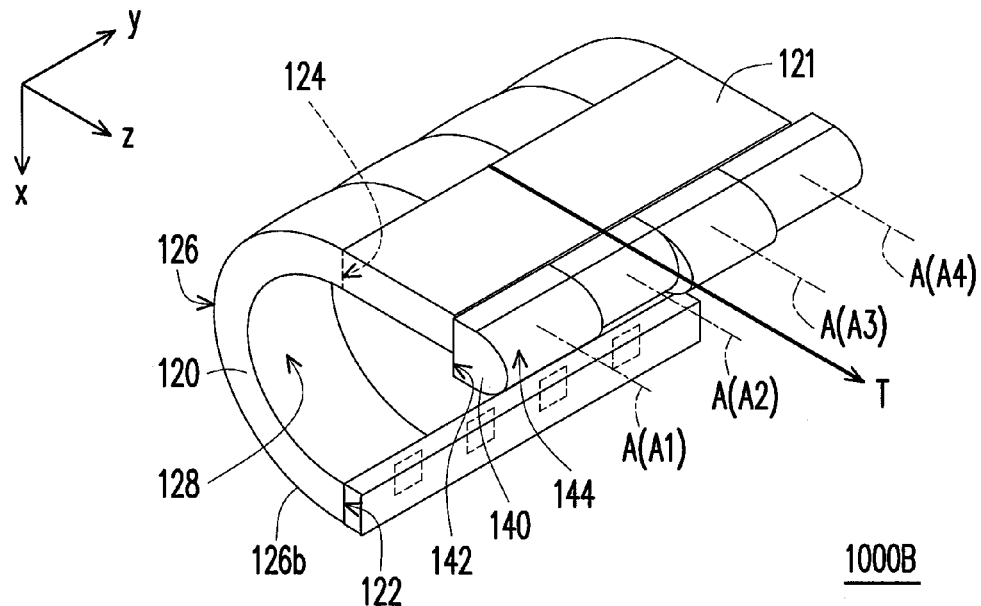
FIG. 7 is a schematic three-dimensional diagram of a light source module according to another embodiment of the invention.

In the embodiment, the orthogonal projections of the optical axes A of the light-adjusting curved surfaces 144 of the four first lenses 140 on the xz-plane may be aligned with each other, and the four first lenses 140 may be integrally formed. The first lens 140 may be also adhered with the light emitting end 124 or integrally formed with the light-guiding device 120A. In other words, in the embodiment, the four first lenses 140 may perform dimming on the light beams emitted from the light-emitting devices 110 in the same way, which the invention is not limited to. In other embodiments, each of the first lenses 140 may independently perform dimming on the corresponding light-emitting device 110 and the orthogonal projections of the optical axes A of the light-adjusting curved surfaces 144 of the four first lenses 140 on the xz-plane may be staggered from or tilted to each other or the four light-adjusting curved surfaces 144 have different focal lengths, which would be explained in association with FIG. 7. FIG. 7 is a schematic three-dimensional diagram of a light source module according to another embodiment of the invention. Referring to FIG. 7, in the light source module 1000B, the orthogonal projection of the optical axis A of the light-adjusting curved surface 144 of each first lens 140 on the reference plane (xy-plane) may not be aligned with each other. For example, the optical axes A1 and A4 may be parallel to the tangent line T and the orthogonal projections of the optical axes A1 and A4 on the reference plane (xz-plane) may be aligned with each other. However, the optical axes A2 and A3 may be tilted to the tangent line T and the tilting directions of the optical axes A2 and A3 may be opposite to each other. By using the first lenses 140 to independently perform dimming on a light-emitting device 110, the distribution configuration of the light intensity of the light source module 1000B has more flexibility.

Referring to FIG. 6, the light source module 1000A of the embodiment further has a light-mixing segment 121, and the light-mixing segment 121 directly contacts the light emitting end 124, in which the light beam passing through the light emitting end 124 (not shown) may be mixed in the light-mixing segment 121 so as to make the distribution of the exiting light intensity of the light source module 1000A more uniform. In the embodiment, the light-mixing segment 121 and the light-guiding device 120A are integrally formed. However, the light-mixing segment 121 and the light-guiding device 120A are separately formed in other embodiments. In addition, the optical unit 100A of the embodiment further includes a reflective device 150. The light-emitting device 110 is located between the reflective device 150 and the light-converging structure (not shown). The reflective device 150 is configured for reflecting the light beam emitted from the light-emitting device 110 back into the light-converging structure so as to advance the light utilization efficiency of the light source module 1000A, which the invention is not limited to. In other embodiments, the reflective device 150 may not be employed.

The Third Embodiment

Figure 8:
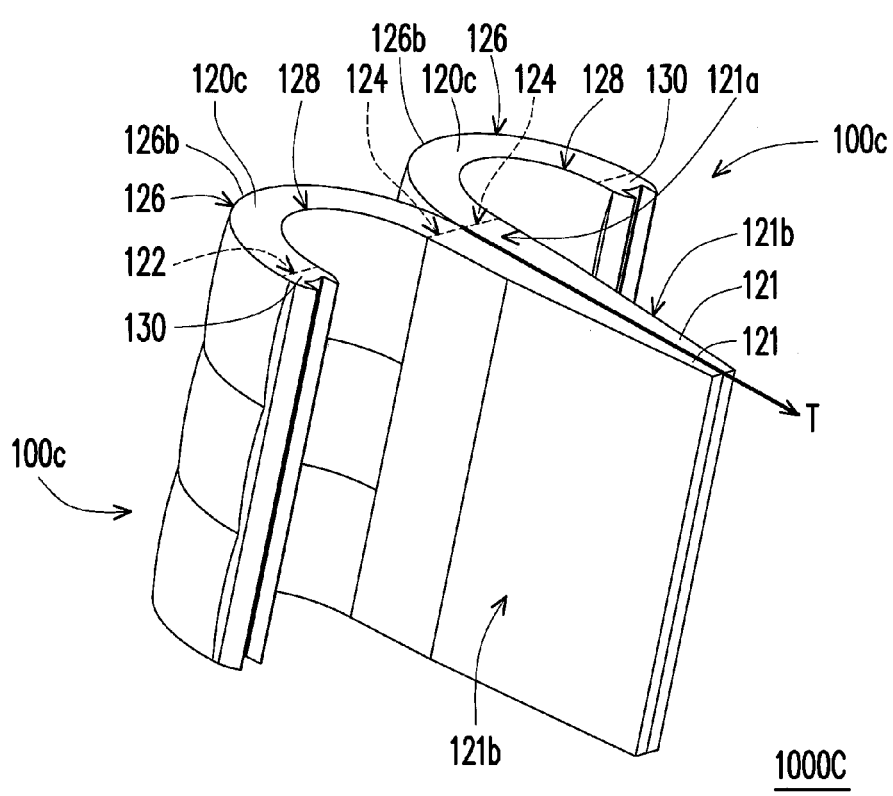
FIG. 8 is a schematic three-dimensional diagram of a light source module according to the third embodiment of the invention.

FIG. 8 is a schematic three-dimensional diagram of a light source module 1000C according to the third embodiment of the invention. Referring to FIG. 8, the light source module 1000C of the embodiment is similar to the light source module 1000 of the first embodiment, and thus, the same parts are represented by the same denotations. The difference of the light source module 1000C of the embodiment from the light source module 1000 of the first embodiment rests in that the light source module 1000C of the embodiment further includes two optical units 100C and a light-mixing segment 121. The difference between the light source modules 1000C and 1000 is described in following, while the duplicated content is omitted to describe.

The light source module 1000C of the embodiment includes two optical units 100C and further includes a light-mixing segment 121. An end 121a of the light-mixing segment 121 connects the two light emitting ends 124 of two light-guiding devices 120C. The two light emitting ends 124 of the two light-guiding devices 120C are located between the two light incident ends 122 of the two light-guiding devices 120C. In the embodiment, the first curved surfaces 126 of the two light-guiding devices 120C are contacted by each other and the two light-guiding devices 120C are mirror symmetry around the reference-plane (yz-plane). The light-mixing segment 121 of the embodiment has two tilting surfaces 121b tilted to the tangent direction T of the first curved line 126b at the light emitting end 124. In the embodiment, the two tilting surfaces 121b are also mirror symmetry around reference-plane (yz-plane). In addition, the light source module 1000C of the embodiment has similar effect and advantage as the light source module 1000, which is omitted to describe.

The Fourth Embodiment

Figure 9:
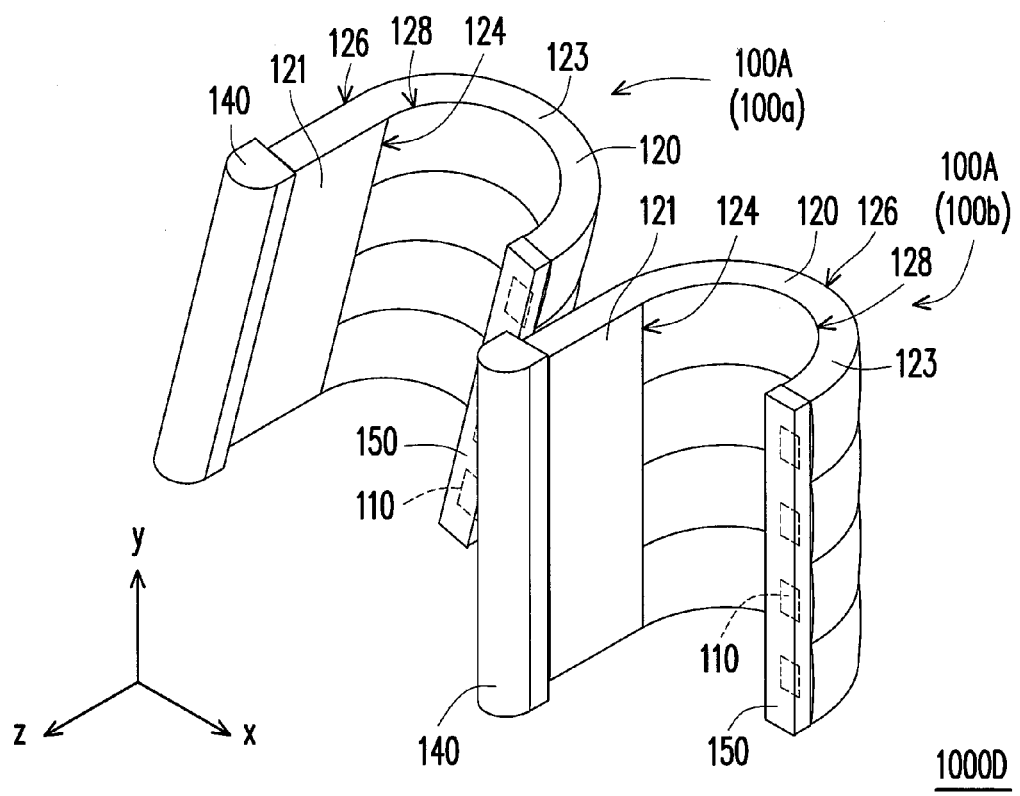
FIG. 9 is a schematic three-dimensional diagram of a light source module according to the fourth embodiment of the invention.

FIG. 9 is a schematic three-dimensional diagram of a light source module 1000D according to the fourth embodiment of the invention. Referring to FIG. 9, the light source module 1000D of the embodiment is similar to the light source module 1000A of the second embodiment, and thus, the same parts are represented by the same denotations. The difference of the light source module 1000D of the embodiment from the light source module 1000A of the second embodiment rests in that the light source module 1000D of the embodiment includes two optical units 100A arranged side by side. The difference between the light source modules 1000D and 1000A is described in following, while the duplicated content is omitted to describe.

Figure 10:
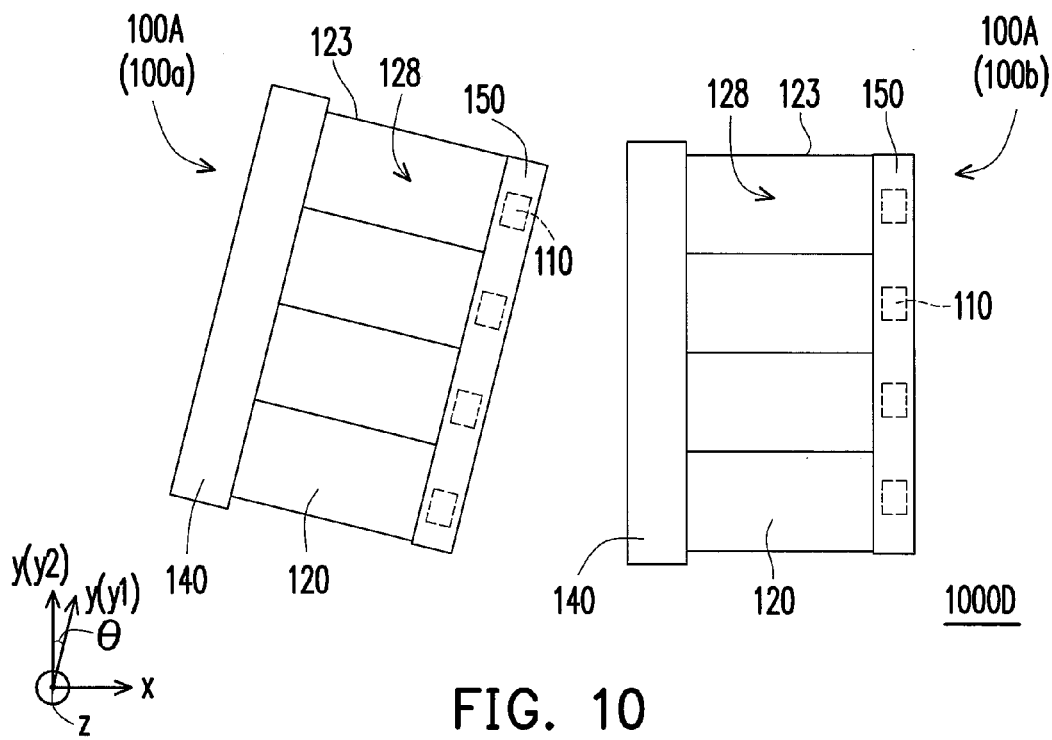
FIG. 10 is a schematic front-view diagram of the light source module of FIG. 9.

FIG. 10 is a schematic front-view diagram of the light source module of FIG. 9. Referring to FIGS. 9 and 10, the light source module 1000D of the embodiment includes two optical units 100A arranged side by side. The two normal directions y1 and y2 of the two side-surfaces 123 of the two optical units 100A are not parallel to each other (shown by FIG. 10). The light-emitting device 110 of the optical unit 100a may be located between the light emitting end 124 of another optical unit 100b and the light emitting end 124 of the optical unit 100a. In other words, the optical unit 100a and the optical unit 100b are side by side, and the optical unit 100a may be tilted to the other optical unit 100b so as to adjust the distribution shape of the exiting light intensity of the light source module 1000D. In the embodiment, the acute angle θ included by the normal directions y1 and y2 may be 15°.

Figure 11:
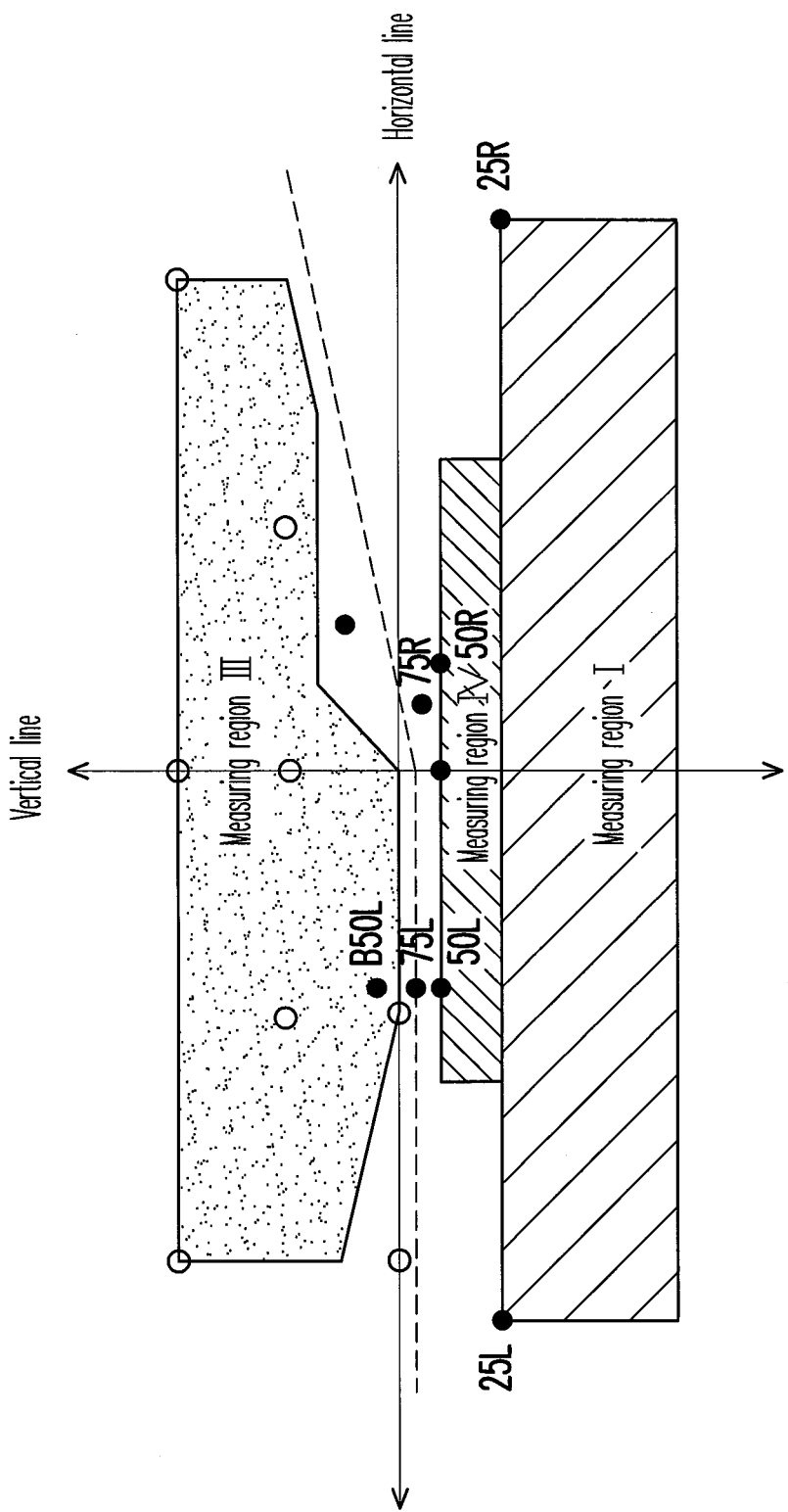
FIG. 11 is the measuring points and the measuring regions for the illuminance configuration of light-radiation pattern at the front of the vehicle headlight with 25 meters defined by the ECE R112 code.

FIG. 11 is the measuring points and the measuring regions for the illuminance configuration of light-radiation pattern at the front of the vehicle headlight with 25 meters defined by the ECE R112 code. Table 1 lists out compliance condition of the illuminances at all the measuring points and measuring regions for the illuminance configuration of light-radiation pattern according to the specification of the ECE R112 code and the measured values of the illuminances at all the corresponding measuring points and measuring regions of the light source module 1000D. It may be seen from Table 1, the illuminance configuration of light-radiation pattern at the front thereof with 25 meters provided by the light source module 1000D in FIG. 9 conforms with the specification of the ECE R112 code.

TABLE 1

| measuring point or measuring region | specification of the ECE R112 code class B lux (SI unit of illuminance) | light source module 1000D lux (SI unit of illuminance) |
| --- | --- | --- |
| B50L | ≤0.4 | 0.4 |
| 75R | ≥12 | 16.2 |
| 75L | ≤12 | 5.7 |
| 50L | ≤15 | 8.1 |
| 50R | ≥12 | 17.7 |
| 50V | ≥6 | 15.9 |
| 25L | ≥2 | 6.3 |
| 25R | ≥2 | 11.8 |
| measuring region I | ≤24 | pass |
| measuring region III | ≤0.7 | pass |
| measuring region IV | ≥3 | pass |

The Fifth Embodiment

Figure 12:
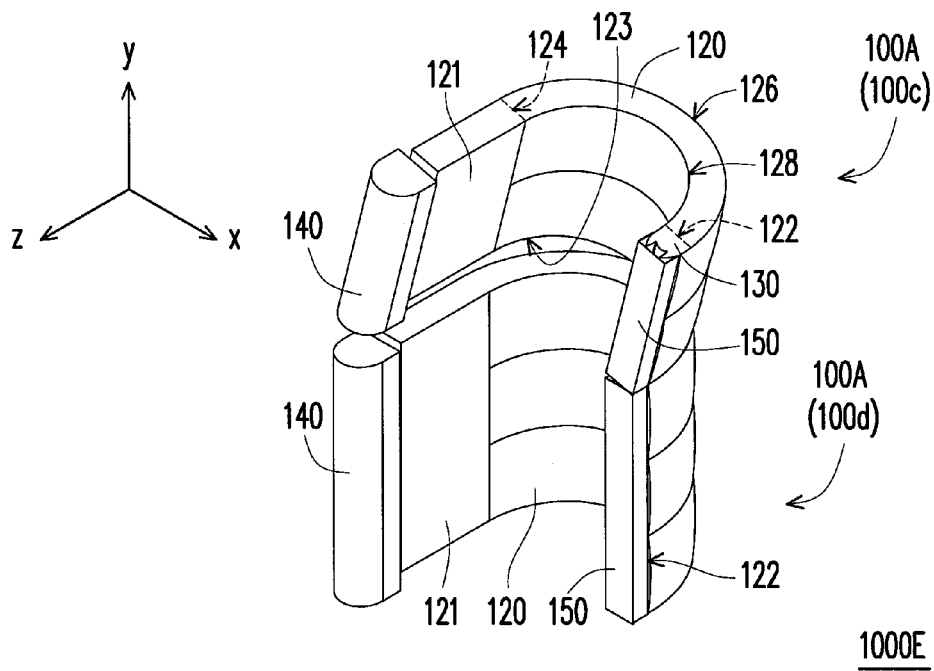
FIG. 12 is a schematic three-dimensional diagram of a light source module according to the fifth embodiment of the invention.
Figure 13:
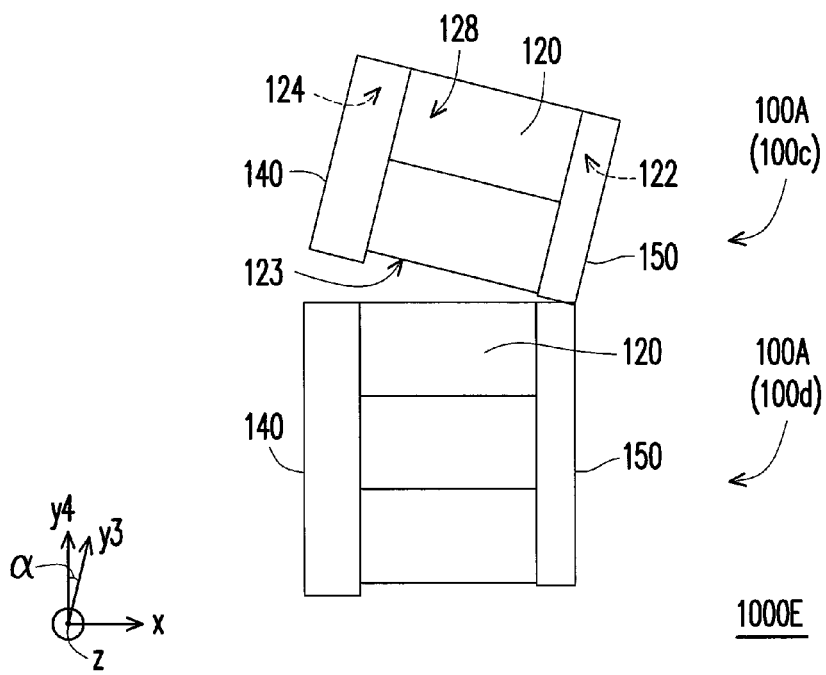
FIG. 13 is a schematic front-view diagram of the light source module of FIG. 12.

FIG. 12 is a schematic three-dimensional diagram of a light source module 1000E according to the fifth embodiment of the invention. Referring to FIG. 12, the light source module 1000E of the embodiment is similar to the light source module 1000A of the second embodiment, and thus, the same parts are represented by the same denotations. The difference of the light source module 1000E of the embodiment from the light source module 1000A of the second embodiment rests in that the light source module 1000E of the embodiment includes two optical units 100A stacked up and down with each other. The difference between the light source modules 1000E and 1000A is described in following, while the duplicated content is omitted to describe FIG. 13 is a schematic front-view diagram of the light source module 1000E of FIG. 12. Referring to FIGS. 12 and 13, the light source module 1000E of the embodiment includes two optical units 100A stacked up and down with each other. The side-surface 123 of the optical unit 100c is located between the light incident ends 122 of the optical unit 100c and the light incident ends 122 of the other optical units 100d. In other words, the optical unit 100c is stacked on the optical units 100d. The normal direction y3 of the side-surface 123 of the optical unit 100c and the normal direction y4 of the side-surface 123 of the other optical unit 100d are not parallel to each other. That is to say, the optical units 100C is tilted to the optical units 100d. In the embodiment, the acute angle included by two width directions y3 and y4 may be 15°.

The Sixth Embodiment

Figure 14:
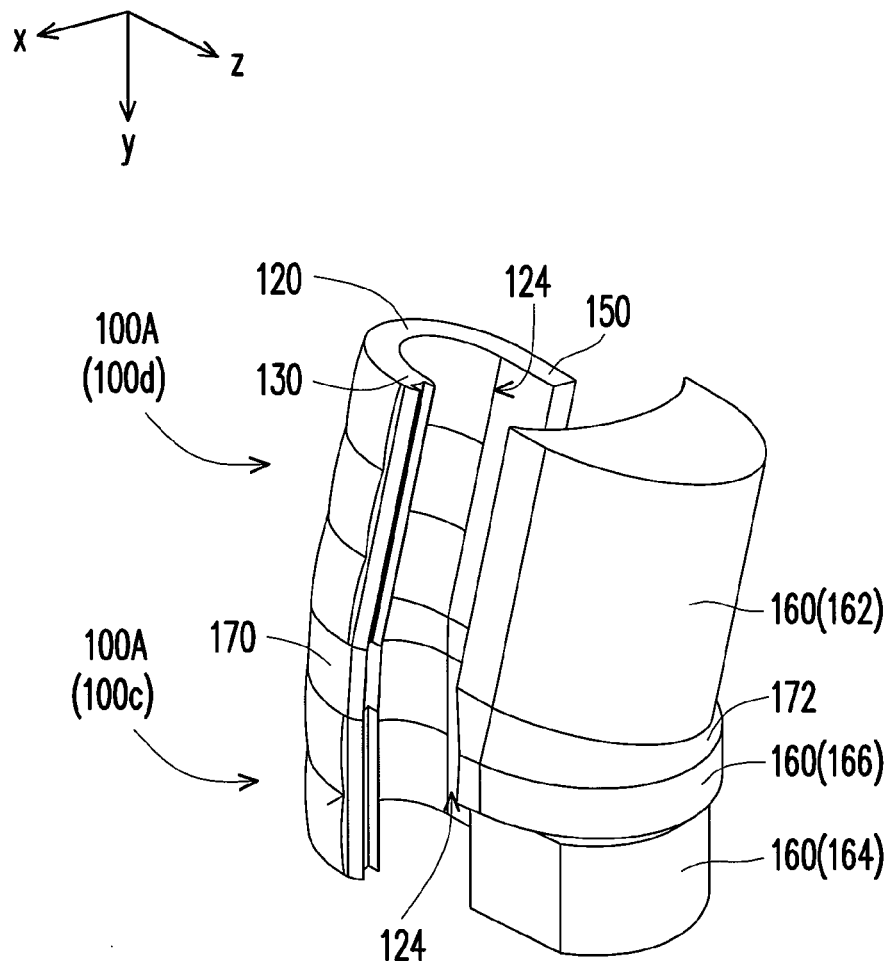
FIG. 14 is a schematic three-dimensional diagram of a light source module according to the sixth embodiment of the invention.

FIG. 14 is a schematic three-dimensional diagram of a light source module 1000F according to the sixth embodiment of the invention. For description simplicity, the first lens 140 and the reflective device 150 are omitted in FIG. 14, but the first lens 140 and the reflective device 150 in the light source module 1000F may refer to FIG. 12 for understanding. Referring to FIG. 14, the light source module 1000F of the embodiment is similar to the light source module 1000E of the fifth embodiment, and thus, the same parts are represented by the same denotations. The difference of the light source module 1000F of the embodiment from the light source module 1000E of the fifth embodiment rests in that each of the optical units 100A in the light source module 1000F of the embodiment further includes a light-adjusting device 160. The difference between the light source modules 1000F and 1000E is described in following, while the duplicated content is omitted to describe.

In the light source module 1000F of the embodiment, each of the optical units 100A further includes a light-adjusting device 160 located beside the light emitting ends 124. The first lens (not shown) and the light-converging structure 130 are located between the light-guiding device 120 and the light-adjusting device 160. A light-adjusting device 162 corresponding to the optical units 100d is configured for converging the light beam. Another light-adjusting device 164 corresponding to the other optical units 100c is configured for diverging the light beam. The light source module 1000F of the embodiment further includes a first connecting part 170, a second connecting part (not shown) and a third connecting part 172. The first connecting part 170 is connected to the light-guiding device 120 of the optical unit 100d and the light-guiding device 120 of the optical unit 100c. The second connecting part is connected to the first lens (not shown) of the optical units 100d and the first lens of the optical units 100c. The light source module 1000F of the embodiment further includes a light-adjusting device 166. The light-adjusting device 166 is configured for diverging the light beam. The third connecting part 172 is connected to the light-adjusting devices 162 and 166. The light-adjusting device 162, the third connecting part 172, the light-adjusting device 166 and the light-adjusting device 164 may be sequentially combined together. In other words, the light-adjusting device 162, the third connecting part 172, the light-adjusting device 166 and the light-adjusting device 164 may be integrally formed or formed by adhering them.

Figure 15:
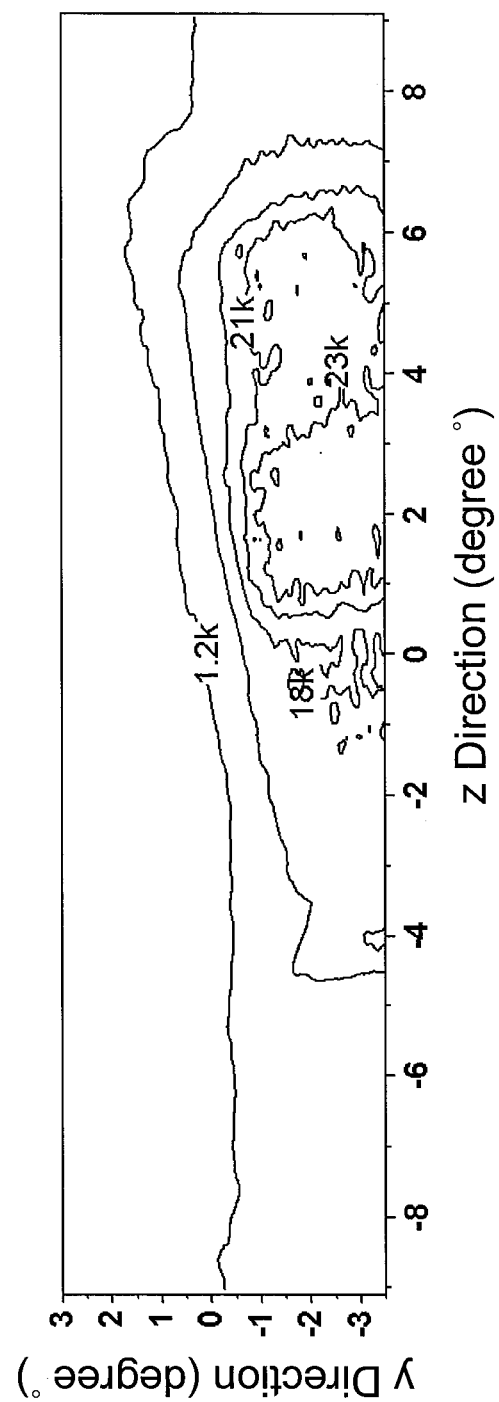
FIG. 15 illustrates the illuminance configuration of light-radiation pattern of the light source module of FIG. 14 at the front thereof with 25 meters.

FIG. 15 illustrates the luminous intensity (SI unit, candela) configuration along with different angles of light-radiation pattern of the light source module of FIG. 14. Tables 2 and 3 list out compliance condition of the luminous intensity at all the measuring points and measuring regions according to the specification of the ECE R112 code and the measured values of the luminous intensity at all the corresponding measuring points and measuring regions of the light source module 1000E. It may be seen from Tables 2 and 3, the luminous intensity vs. angle configuration provided by the light source module 1000E conforms with the specification of the ECE R112 code. Even the light source module 1000E is at the heat attenuation (i.e., when the illuminance is reduced to 70% of the initial illuminance), the luminous intensity vs. angle configuration provided by the light source module 1000E also conforms with the specification of the ECE R112 code.

TABLE 2

| measuring point | specification (class B) | | specified value (candela) | (specified value)/0.7 (candela) | value of light source module 1000E (candela) | state |
| --- | --- | --- | --- | --- | --- | --- |
| B50L | max. value | | 350 | 500 | 183.96 | pass |
| BR | max. value | | 1750 | 2500 | 452.61 | pass |
| 75R | | min. value | 10100 | 14428.57 | 20366.35 | pass |
| 75L | max. value | | 10600 | 15142.86 | 2700.49 | pass |
| 50L | max. value | | 13200 | 18857.14 | 4718.66 | pass |

TABLE 2-continued

| measuring point | specification (class B) | specified value (candela) | (specified value)/0.7 (candela) | value of light source module 1000E (candela) | state |
| --- | --- | --- | --- | --- | --- |
| 50R | min. value | 10100 | 14428.27 | 22173.76 | pass |
| 50V | min. value | 5100 | 7285.71 | 14649.50 | pass |
| 25L | min. value | 1700 | 2428.57 | 3675.44 | pass |
| 25R | min. value | 1700 | 2428.57 | 5190.45 | pass |

TABLE 3

| measuring region | specification (class B) | | specified value (candela) | (specified value)/0.7 (candela) | state |
| --- | --- | --- | --- | --- | --- |
| III | max. value | | 625 | 892.86 | pass |
| IV | | min. value | 2500 | 3571.43 | pass |
| I | max. value | | 44347.53 | 63353.61 | pass |

In summary, in an embodiment of the invention, the light source module, by changing arrangement and combinations of the optical units, may achieve the luminous intensity vs. angle configuration of the specification of the ECE R112 code, so that the light utilization efficiency of the light source module in an embodiment of the invention may be significantly advanced. The light source module of an embodiment of the invention, by disposing the first curved surface, the second curved surface and the light-converging structure, is able to make the diverging conic angle of the exiting light beam more concentrated on two different directions, which further advances the converging effect of the light source module so as to form a bright surface with high contrast bright-dark cut-off lines on the surface of the illumination region irradiated by the light source module. The light source module in an embodiment of the invention, by disposing the first lens or the light-adjusting device, is able to form a plurality of bright spots focused by light beams and a light-radiation pattern configuration of the uniform bright surface in the illumination region irradiated by the light source module, and is able to separately adjust the light-radiation pattern of the bright surface and the positions and the relative positions of the bright spots focused by the light beams and the bright surface and make the position of the bright spot focused by the light beam close to the edge of the bright surface by adjusting the focal length or the deflection direction of the first lens or the light-adjusting device. Since the light source module in an embodiment of the invention utilizes most of the light beams emitted by the light-emitting devices to irradiate at predetermined positions of the illumination region and form uniform bright surface and focusing bright spots, the invention may save energy without additionally increasing the power of the light-emitting device as the prior art.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
   at least one optical unit, wherein the optical unit comprises:
      at least one light-emitting device;
      at least one light-guiding device, having a light incident end, a light emitting end, a first curved surface connecting the light incident end and the light emitting end, a second curved surface opposite to the first curved surface and connecting the light incident end and the light emitting end, and a side-surface connecting the first curved surface, the second curved surface, the light incident end, and the light emitting end, wherein the light-emitting device is disposed beside the light incident end, a cross-sectional line of the first curved surface sectioned by the side-surface is a first curved line, and a cross-sectional line of the first curved surface sectioned by a reference plane perpendicular to the side-surface is a second curved line; and
      at least one light-converging structure, located between the light-emitting device and the light incident end and having a first arc-convex surface protruded towards the light-emitting device and two second convex surfaces respectively located at two opposite sides of the first arc-convex surface, wherein the first arc-convex surface and the two second convex surfaces are arranged along a direction parallel to the side-surface.

2. The light source module as claimed in claim 1, wherein the first curved line is quadratic curved line.

3. The light source module as claimed in claim 1, wherein the second curved line is quadratic curved line and the quadratic curved line is parabola or elliptic curve.

4. The light source module as claimed in claim 3, wherein the second curved line has a focus and an orthogonal projection of the focus on the reference plane is superposed with an orthogonal projection of the light-emitting device on the reference plane.

5. The light source module as claimed in claim 1, wherein a cross-sectional line of the first arc-convex surface sectioned by the side-surface and a cross-sectional lines of the second convex surfaces sectioned by the side-surface comprise curved lines, and a cross-sectional line of the first arc-convex surface sectioned by the reference plane and a cross-sectional lines of the second convex surfaces sectioned by the reference plane comprise straight lines.

6. The light source module as claimed in claim 5, wherein the cross-sectional line of the first arc-convex surface sectioned by the side-surface and the cross-sectional lines of the second convex surfaces sectioned by the side-surface comprise parabolas.

7. The light source module as claimed in claim 1, wherein a cross-sectional line of the second curved surface sectioned by the reference plane comprises a straight line.

8. The light source module as claimed in claim 1, wherein the optical unit further comprises a first lens located beside the light emitting end.

9. The light source module as claimed in claim 8, wherein the first lens has a light incident surface and a light-adjusting curved surface, the light incident surface is located between the light-adjusting curved surface and the light emitting end, and the light-adjusting curved surface is an aspheric curved surface.

10. The light source module as claimed in claim 9, wherein the light-adjusting curved surface has an optical axis and the optical axis is substantially parallel to a tangent direction of the first curved line at the light emitting end.

11. The light source module as claimed in claim 9, wherein the light-adjusting curved surface has an optical axis and the optical axis is tilted to the tangent direction of the first curved line at the light emitting end.

12. The light source module as claimed in claim 9, wherein a cross-sectional line of the light-adjusting curved surface sectioned by the side-surface comprises a curved line and an orthogonal projection of the light-adjusting curved surface on the reference plane comprises a straight line.

13. The light source module as claimed in claim 1, further comprising a plurality of light-emitting devices arranged along a normal direction of the side-surface, a plurality of light-guiding devices arranged along the normal direction of the side-surface, and a plurality of light-converging structures arranged along the normal direction of the side-surface.

14. The light source module as claimed in claim 1, further comprising a plurality of optical units, wherein directions of the side-surfaces of the optical units are not parallel to each other.

15. The light source module as claimed in claim 14, wherein one of the light-emitting device of the optical units is located between the light emitting end of the optical unit and the light emitting end of another optical unit among the optical units.

16. The light source module as claimed in claim 14, wherein the side-surface of one of the optical units is located between the light incident end of the optical unit and the light incident end of another optical unit among the optical units.

17. The light source module as claimed in claim 14, wherein each of the optical units further comprises a first lens and a light-adjusting device both located beside the light emitting end and the first lens and the light-converging structure are located between the light-guiding device and the light-adjusting device, wherein the light-adjusting device of the optical unit among the optical units is configured for converging light, while the light-adjusting device of another optical unit among the optical units is configured for diverging light.

18. The light source module as claimed in claim 1, wherein the optical unit further comprises a reflective device, the light-emitting device is located between the reflective device and the light-converging structure.

19. The light source module as claimed in claim 1, wherein the light-guiding device further comprises a light-mixing segment and the light-mixing segment is connected to the light emitting end.

20. The light source module as claimed in claim 19, wherein the light-mixing segment has a tilting surface tilted relatively to the tangent direction of the first curved line at the light emitting end.

21. The light source module as claimed in claim 1, further comprising another optical unit, wherein the light source module further comprises a light-mixing segment, one end of the light-mixing segment is connected to the two light emitting ends of the two light-guiding devices of the two optical units, and the two light emitting ends of the two light-guiding devices are located between the two light incident ends of the two light-guiding devices.

\* \* \* \* \*